(12) United States Patent
Ferkany

(10) Patent No.: US 7,299,907 B2
(45) Date of Patent: Nov. 27, 2007

(54) HYDRAULIC SHOCK ABSORBER AND METHOD

(75) Inventor: Michael A. Ferkany, White Lake, MI (US)

(73) Assignee: Ace Controls, Inc., Farmington Hills, MI (US)

( * ) Notice: Subject to any disclaimer, the term of this patent is extended or adjusted under 35 U.S.C. 154(b) by 156 days.

(21) Appl. No.: 11/041,761

(22) Filed: Jan. 24, 2005

(65) Prior Publication Data

US 2006/0163016 A1    Jul. 27, 2006

(51) Int. Cl.
*F16F 9/48* (2006.01)

(52) U.S. Cl. .................. 188/286; 188/284; 188/322.19

(58) Field of Classification Search ................ 188/284, 188/286, 288, 289, 315, 322.19; 267/64.22, 267/64.26
See application file for complete search history.

(56) References Cited

U.S. PATENT DOCUMENTS

| | | | |
|---|---|---|---|
| 1,539,196 A | 5/1925 | Litten | |
| 1,918,697 A | 7/1933 | Gruss | |
| 2,570,362 A * | 10/1951 | Mercier | .................... 188/282.7 |
| 3,056,598 A | 10/1962 | Conway et al. | |
| 3,171,643 A | 3/1965 | Roos | |
| 3,363,894 A | 1/1968 | Hill | |
| 3,797,366 A | 3/1974 | Hanes et al. | |
| 4,405,119 A * | 9/1983 | Masclet et al. | .......... 267/64.22 |
| 4,915,364 A | 4/1990 | Perlini | |
| 5,148,896 A | 9/1992 | Ralph | |
| 5,169,131 A | 12/1992 | Shimura | |
| 5,529,519 A | 6/1996 | Nakamura et al. | |
| 6,443,271 B2 | 9/2002 | Schmidt | |
| 6,619,445 B2 | 9/2003 | Forster | |
| 6,659,242 B2 | 12/2003 | Nagai | |
| 2002/0088676 A1 | 7/2002 | Zehler | |
| 2003/0075403 A1 | 4/2003 | Dernebo | |
| 2003/0213663 A1 | 11/2003 | Salice | |

* cited by examiner

*Primary Examiner*—Melody M. Burch
(74) *Attorney, Agent, or Firm*—Price, Heneveld, Cooper, DeWitt & Litton, LLP

(57) ABSTRACT

A hydraulic shock absorber has an outer body with a central bore. A first piston is telescopingly received in the central bore adjacent a closed end thereof, and has a generally annular shape with an inner surface defining a central piston bore, and an outer surface disposed adjacent the sidewall of the central body bore to define a first annularly-shaped metering aperture. A second piston is telescopingly received in the central bore of the first piston, and has an outer surface disposed adjacent to the inner surface of the first piston to define a second annularly-shaped metering aperture therebetween. Hydraulic fluid is disposed in the central body bore between the closed end thereof and the pistons, such that inwardly directed impact forces on the pistons displace the hydraulic fluid through the metering apertures to progressively dampen the impact forces.

68 Claims, 5 Drawing Sheets

HYDRAULIC SHOCK ABSORBER AND METHOD

BACKGROUND OF THE INVENTION

The present invention relates to hydrolic shock absorbers, and in particular to a telescoping piston and metering design therefor, as well as a related method.

Virtually all manufacturing processes involve movement of some kind. In production machinery, this movement can involve linear transfers, rotary index motions, fast feeds, etc. At some point, these motions change direction or come to a complete stop. Any moving object possesses kinetic energy as a result of its motion. When the object changes direction or is brought to rest, the dissipation of this kinetic energy can result in destructive shock forces with the structural and operating parts of the machine. Kinetic energy increases as an exponential function of velocity. The heavier the object, or the faster it travels, the more kinetic energy it possesses. An increase in production rates is only possible by dissipating this kinetic energy smoothly and thereby eliminating destructive deceleration forces.

Older methods of energy absorption, such as rubber buffers, springs, hydraulic dash pots and cylinder cushions, do not provide the smooth deceleration characteristics required for most modern machinery. Such prior art devices are generally nonlinear, and produce high peak forces at some point during their stroke.

Industrial shock absorbers have been developed to meet at least some of these needs. Currently, there are two basic kinds of linear decelerating shock absorbers, namely, adjustable and nonadjustable. Adjustable shock absorbers, such as that disclosed in U.S. Pat. No. 4,122,923, are adapted for use in conjunction with a wide range of loads or weights. For instance, a single adjustable shock absorber, when properly adjusted, can decelerate loads from 24 pounds to 2,400 pounds, which is a ratio of 100 to 1. However, once adjusted, such devices function as a nonadjustable shock absorber, which is limited to a weight range or ratio of 2 to 1, as for example 24 pounds to 48 pounds. The advantage of an adjustable shock absorber is that it can be adjusted to any one of the weights from 24 pounds to 2,400 pounds. However, a disadvantage of an adjustable shock absorber is that, once it is adjusted for one weight, it cannot accommodate substantial variation in weight, propelling force, environmental conditions, or other similar factors.

Nonadjustable shock absorbers, such as those disclosed in U.S. Pat. No. 5,682,967, cannot be used for a wide variety of different applications, but rather are custom designed to accommodate a specific application. Nonadjustable shock absorbers are capable of accommodating a range of weights with ratios as high as 10 to 1. A nonadjustable shock absorber can also be designed to provide a customer specific deceleration or reaction force, which produces better audible and visual performance to the human observer. Some types of nonadjustable shock absorbers have a piston tube with a special orifice pattern or profile to create a self-compensating feature which neutralizes the effect of changing fluid coefficients, weight velocity, temperature and fluid compressibility, and is therefore beneficial in many applications. Even though a nonadjustable shock absorber can be designed to accommodate a range of weights, it cannot accommodate a weight range nearly as wide as an adjustable shock absorber.

One drawback associated with current shock absorbers is that both adjustable and nonadjustable shock absorber designs are rather complex, and relatively difficult to manufacture. For example, the nonadjustable shock absorber disclosed in U.S. Pat. No. 5,682,967 utilizes a series of precisely formed, discrete circular metering orifices spaced at predetermined points along the length of an inner piston tube to achieve relatively constant linear deceleration. While such constructions are generally effective, the precision machining required to ensure the inner piston tube and related circular orifices are positioned at the correct positions, and are of the appropriate diameters, is an expensive and time-consuming task. Adjustable shock absorbers, such as that disclosed in U.S. Pat. No. 4,122,923, typically included complicated valving arrangements, which are also expensive to manufacture and assemble.

Furthermore, current industrial shock absorbers incorporate a plurality of individual parts which must be properly assembled to make the designed shock absorber. These individual parts are custom designed for a particular application, thereby increasing fabrication, inventory and other manufacturing costs.

Hence, the need exists for an industrial shock absorber having a relatively uncomplicated design, so as to reduce manufacturing costs and improve reliability. Also, it would be beneficial to have an uncomplicated hydraulic shock absorber design that is highly effective in decelerating loads with the lowest possible force in the shortest possible time, thereby eliminating damaging force peaks and shock damage to machines and equipment. It would also be beneficial to have a shock absorber design that possesses the benefits of a nonadjustable shock absorber, yet can be used for a wide range of loads or weights, such as those ranges typically associated with adjustable shock absorbers.

SUMMARY OF THE INVENTION

One aspect of the present invention is a hydraulic shock absorber, comprising an outer body having a central body bore defined by a cylindrical sidewall surface, a closed end and an open end disposed opposite the closed end. A first piston is telescopingly received in the central bore of the outer body adjacent the closed end thereof, and has a generally annular shape with a cylindrically-shaped inner surface defining a central piston bore, and a cylindrically-shaped outer surface disposed adjacent the sidewall surface of the central body bore to define a first annularly-shaped metering aperture therebetween. A second piston is telescopingly received in the central piston bore of the first piston, and has a generally cylindrically-shaped outer surface disposed adjacent the inner surface of the first piston to define a second annularly-shaped metering aperture therebetween. The central body bore defines a pressure chamber between the first and second pistons and the closed end of the outer body. A piston rod has a first end thereof operably connected with the second piston, and a second end thereof disposed adjacent the open end of the outer body. Hydraulic fluid is disposed in the pressure chamber, whereby inwardly directed impact forces acting on the second end of the piston rod shift the first and second pistons toward the closed end of the outer body, thereby displacing the hydraulic fluid in the pressure chamber through the first and second metering apertures to progressively dampen the impact forces.

Another aspect of the present invention is a hydraulic shock absorber, comprising an outer body having a central body bore defined by a cylindrical sidewall surface, a closed end and an open end disposed opposite the closed end. A first piston is telescopingly received in the central bore of the outer body adjacent the closed end thereof, and has a generally annular shape with a cylindrically-shaped inner surface defining a first central piston bore, and a cylindrically-shaped outer surface disposed adjacent the sidewall surface of the central body bore to define a first annularly-shaped metering aperture therebetween. A second piston is telescopingly received in the first central piston bore of the first piston, and has a generally annular shape with a cylindrically-shaped inner surface defining a second central piston bore, and a cylindrically-shaped outer surface disposed adjacent the inner surface of the first piston to define a second annularly-shaped metering aperture therebetween. A third piston is telescopingly received in the second central piston bore of the second piston, and has a generally cylindrically-shaped outer surface disposed adjacent the inner surface of the second piston to define a third annularly-shaped metering aperture therebetween. The central body bore defines a pressure chamber between the first, second and third pistons and the closed end of the outer body. A piston rod has a first end thereof operably connected with the third piston, and a second end thereof disposed adjacent the open end of the body. Hydraulic fluid is disposed in the pressure chamber, whereby inwardly directed impact forces acting on the second end of the piston rod shift the first, second and third pistons toward the closed end of the outer body, thereby displacing the hydraulic fluid in the pressure chamber through the first, second and third metering apertures to progressively dampen the impact forces.

Yet another aspect of the present invention is a method for making a hydraulic shock absorber, comprising providing an outer body having a central body bore defined by a cylindrical sidewall surface, a closed end and an open end disposed opposite the closed end. The method further includes providing a first piston having a generally annular shape with a cylindrically-shaped inner surface defining a central piston bore and a cylindrically-shaped outer surface, and positioning the first piston telescopingly within the central body bore of the outer body with the outer surface of the first piston disposed adjacent to the sidewall surface of the central body bore to define a first annularly-shaped metering aperture therebetween. The method further includes providing a second piston having a generally cylindrically-shaped outer surface, and positioning the second piston telescopingly within the central piston bore of the first piston with the outer surface of the second piston disposed adjacent to the inner surface of the first piston to define a second annularly-shaped metering aperture therebetween. Hydraulic fluid is installed in the central body bore of the outer body between the first and second pistons and the closed end of the outer body, such that inwardly directed impact forces acting on the first and second pistons displace the hydraulic fluid through the first and second metering apertures to progressively dampen the impact forces.

Yet another aspect of the present invention is a method for making a hydraulic shock absorber having predetermined reaction characteristics, comprising providing an outer body having a central body bore defined by a cylindrical sidewall surface, a closed end and an open end disposed opposite the closed end. The method also includes providing a plurality of first pistons having a generally annular shape with cylindrically-shaped inner surfaces defining central piston bores with a variety of different diameters and cylindrically-shaped outer surfaces with a variety of different diameters. The method further includes selecting one of the first pistons and positioning the same telescopingly within the central body bore of the outer body with the outer surface of the one piston disposed adjacent to the sidewall surface of the central body bore to define a first annularly-shaped metering aperture therebetween with a predetermined width selected to correspond with at least a portion of the predetermined reaction characteristics of the hydraulic shock absorber. The method further includes providing a plurality of second pistons having generally cylindrically-shaped outer surfaces with a variety of different diameters, and selecting one of the second pistons and positioning the same telescopingly within the central piston bore of the one first piston with the outer surface of the one second piston disposed adjacent to the inner surface of the one first piston to define a second annularly-shaped metering aperture therebetween with a predetermined width selected to correspond with at least a portion of the predetermined reaction characteristics of the hydraulic shock absorber. Hydraulic fluid is installed in the central body bore of the outer body between the one first and second pistons and the closed end of the outer body, such that inwardly directed impact forces acting on the one first and second pistons displace the hydraulic fluid through the first and second metering apertures to progressively dampen the impact forces in a manner consistent with the predetermined reaction characteristics of the hydraulic shock absorber.

Yet another aspect of the present invention is a method for making a hydraulic shock absorber having predetermined reaction characteristics, comprising providing an outer body having a central body bore defined by a cylindrical sidewall surface, a closed end and an open end disposed opposite the closed end. The method further includes providing a plurality of first pistons having a generally annular shape with cylindrically-shaped inner surfaces defining central piston bores, cylindrically-shaped outer surfaces, and axial stops defining a variety of different strokes. The method further includes selecting one of the first pistons with a predetermined stroke selected to correspond with at least a portion of the predetermined reaction characteristics of the hydraulic shock absorber, and positioning the same telescopingly within the central body bore of the outer body for axial translation between the predetermined stroke with the outer surface of the one piston disposed adjacent to the sidewall surface of the central body bore to define a first annularly-shaped metering aperture therebetween. The method further includes providing a plurality of second pistons having generally cylindrically-shaped outer surfaces and axial stops defining a plurality of different strokes, and selecting one of the second pistons with a second predetermined stroke selected to correspond with at least a portion of the predetermined reaction characteristics of the hydraulic shock absorber, and positioning the same telescopingly within the central piston bore of the one first piston for axial translation between the second predetermined stroke, with the outer surface of the one second piston disposed adjacent to the inner surface of the one first piston to define a second annularly-shaped metering aperture therebetween. Hydraulic fluid is installed in the central body bore of the outer body between the one first and second pistons and the closed end of the outer body, such that inwardly directed impact forces acting on the one first and second pistons displace the hydraulic fluid through the first and second metering apertures to progressively dampen the impact forces in a manner consistent with the predetermined reaction characteristics of the hydraulic shock absorber.

Yet another aspect of the present invention is a method for making a hydraulic shock absorber having predetermined reaction characteristics, comprising providing an outer body having a central body bore defined by a cylindrical sidewall surface, a closed end and an open end disposed opposite the closed end. The method further includes providing a first piston having a generally annular shape with a cylindrically-shaped inner surface defining a central piston bore and a cylindrically-shaped outer surface, and positioning the first piston telescopingly within the central body bore of the outer body with the outer surface of the first piston disposed adjacent to the sidewall surface of the central body bore to define a first annularly-shaped metering aperture therebetween. The method further includes providing a second piston having a generally cylindrically-shaped outer surface, and positioning the second piston telescopingly within the central piston bore of the first piston with the outer surface of the second piston disposed adjacent to the inner surface of the first piston to define a second annularly-shaped metering aperture therebetween. The method further includes providing a plurality of hydraulic fluids with a variety of different flow characteristics, selecting one of the hydraulic fluids to correspond with at least a portion of the predetermined reaction characteristics of the hydraulic shock absorber, and installing the selected hydraulic fluid in the central body bore of the outer body between the first and second pistons and the closed end of the outer body, such that inwardly directed impact forces acting on the first and second pistons displace the hydraulic fluid through the first and second metering apertures to progressively dampen the impact forces in a manner consistent with the predetermined reaction characteristics of the hydraulic shock absorber.

Yet another aspect of the present invention is a hydraulic shock absorber having an uncomplicated design with reduced manufacturing costs, which is very reliable, efficient in use and capable of a long operating life. In one aspect of the present invention, a nonadjustable, self-compensating hydraulic shock absorber has a construction made up of interchangeable parts which can be selected and assembled to accommodate a wide range of loads or weights, such as those ranges normally associated with adjustable shock absorbers.

These and other advantages of the invention will be further understood and appreciated by those skilled in the art by reference to the following written specification, claims and appended drawings.

DETAILED DESCRIPTION OF THE PREFERRED EMBODIMENTS

Figure 1:
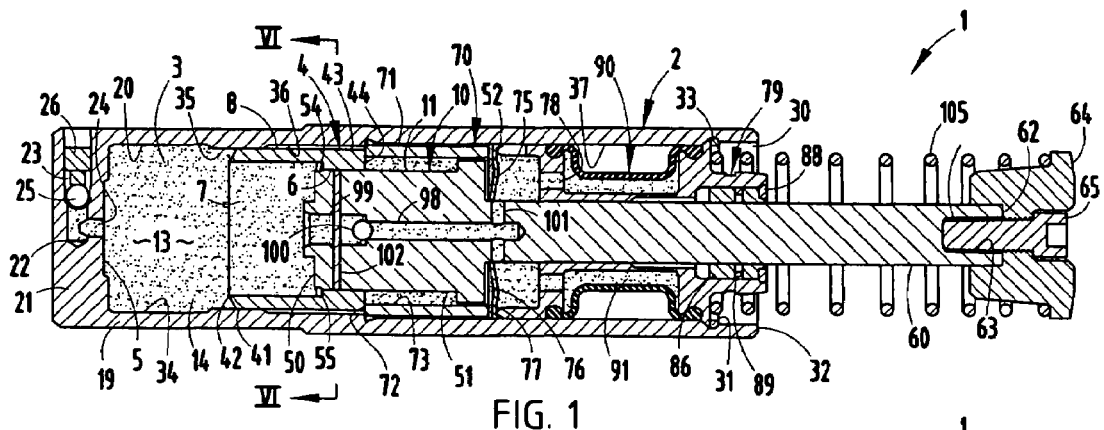
FIG. 1 is a cross-sectional view of a hydraulic shock absorber embodying the present invention, with larger and smaller telescoping pistons shown in a fully extended position.
Figure 2:
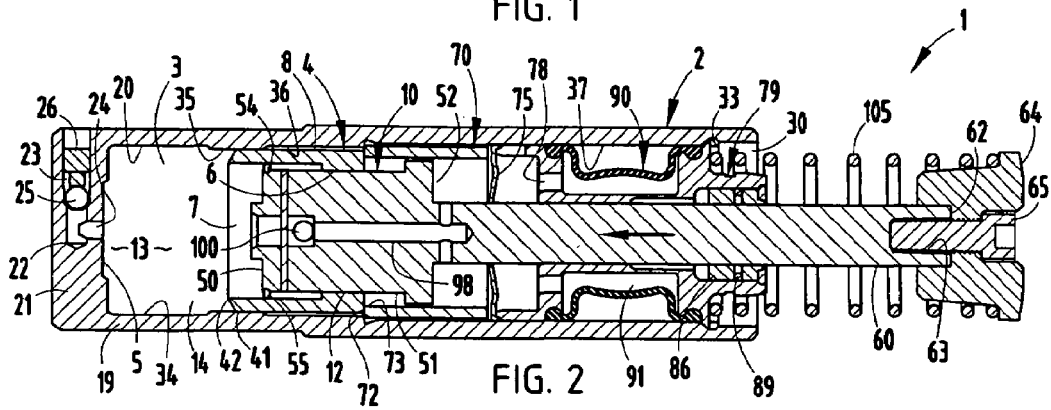
FIG. 2 is a cross-sectional view of the hydraulic shock absorber shown in FIG. 1, wherein the smaller piston is shown in a partially collapsed position.
Figure 3:
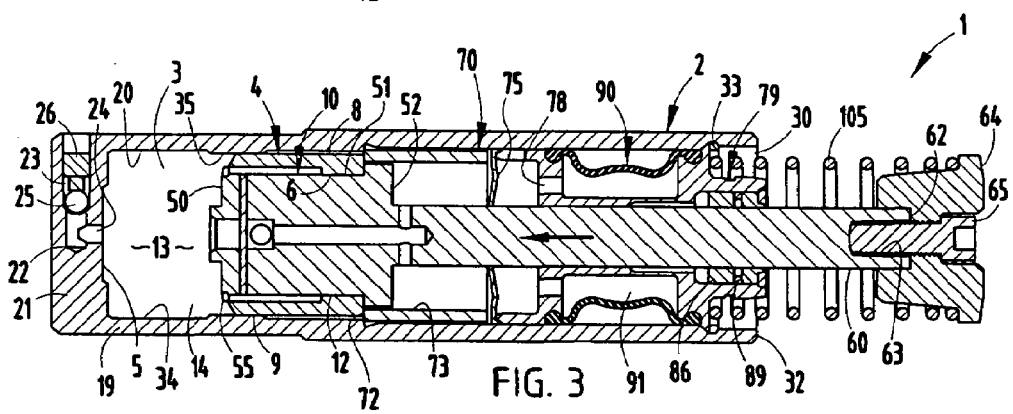
FIG. 3 is a cross-sectional view of the hydraulic shock absorber shown in FIGS. 1 and 2, wherein the smaller piston is shown in a fully collapsed position relative to the larger piston.

For purposes of description herein, the terms "upper", "lower", "right", "left", "rear", "front", "vertical", "horizontal" and derivatives thereof shall relate to the invention as oriented in FIGS. 1-4. However, it is to be understood that the invention may assume various alternative orientations and step sequences, except where expressly specified to the contrary. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

The reference numeral 1 (FIGS. 1-7) generally designates a hydraulic shock absorber embodying the present invention. The illustrated hydraulic shock absorber 1 has an outer body 2 with a central bore 3. A first or larger piston 4 is telescopingly received in the central bore 3 adjacent a closed end 5 thereof, and has a generally annular shape with an inner surface 6 defining a central piston bore 7, and an outer surface 8 disposed adjacent the sidewall of central body bore 3 to define a first annularly-shaped metering aperture 9 (FIG. 6) therebetween. A second or smaller piston 10 (FIGS. 1-5) is telescopingly received in the central piston bore 7 of the larger piston 4, and has an outer surface 11 disposed adjacent to the inner surface 6 of the larger piston 4 to define a second annularly-shaped metering aperture 12 (FIG. 6) therebetween. A pressure chamber 13 (FIGS. 1-4) is formed in the central body bore 3 between the closed end 5 thereof and the pistons 4 and 10, and is filled with hydraulic fluid 14, such that inwardly directed impact forces acting on pistons 4, 10 displace the hydraulic fluid 14 through metering apertures 9 and 12 to progressively dampen the impact forces.

In the example illustrated in FIGS. 1-7, hydraulic shock absorber 1 has a tubular, one-piece outer body 2 defined by a cylindrically-shaped sidewall 19 with an interior surface 20, which defines a portion of central bore 3, and an integrally formed end wall 21 which defines the closed end 5 of the central bore 3 of outer body 2. A fill port 22 extends through end wall 21, and includes a radially extending portion 23 and an axially extending portion 24, which together communicate pressure chamber 13 with ambient environment to facilitate filling hydraulic shock absorber 1 with hydraulic fluid 14. A fill port seal 25 is positioned within the radial portion 23 of fill port 22 and, in the illustrated example, is in the form of a ball which is retained in place by a stop screw 26.

Figure 6:
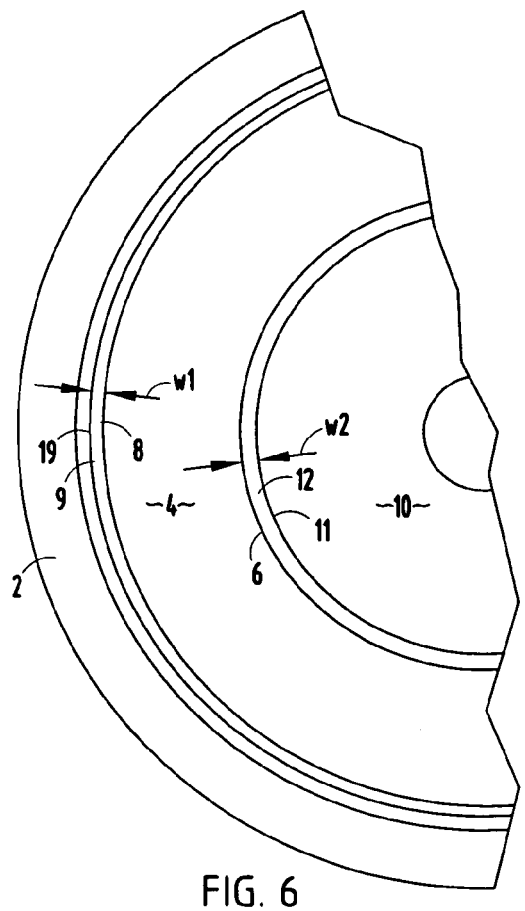
FIG. 6 is a fragmentary, cross-sectional view of the hydraulic shock absorber shown in FIGS. 1-3, taken along the line VI-VI, FIG. 1.
Figure 7:
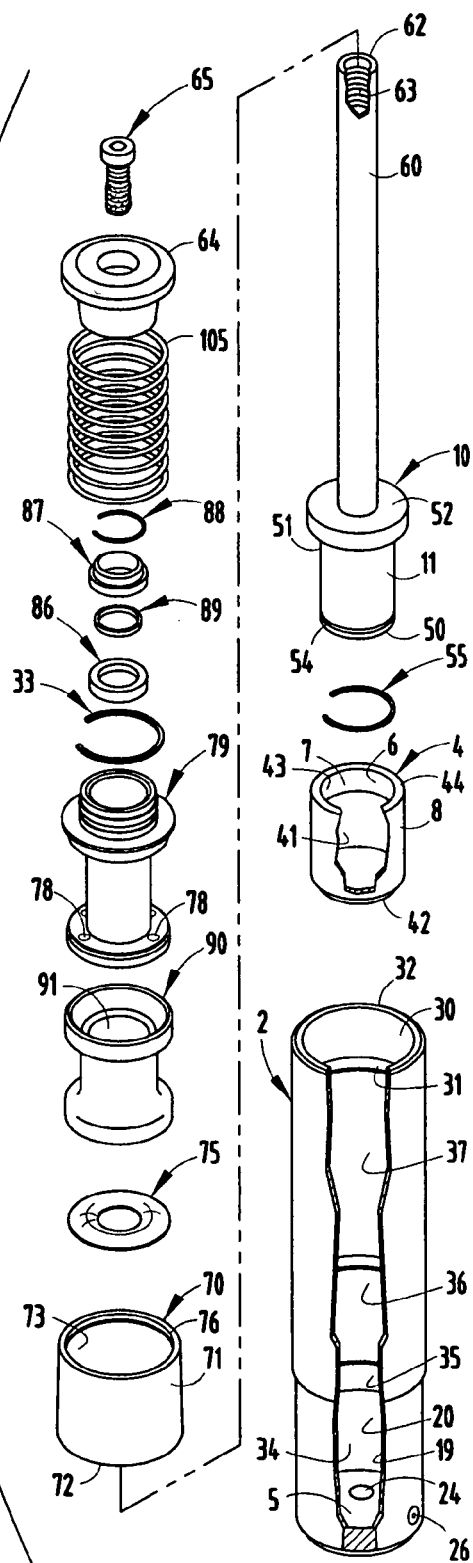
FIG. 7 is an exploded perspective view of the hydraulic shock absorber shown in FIGS. 1-6, with portions thereof broken away to reveal internal construction.
Figure 8:
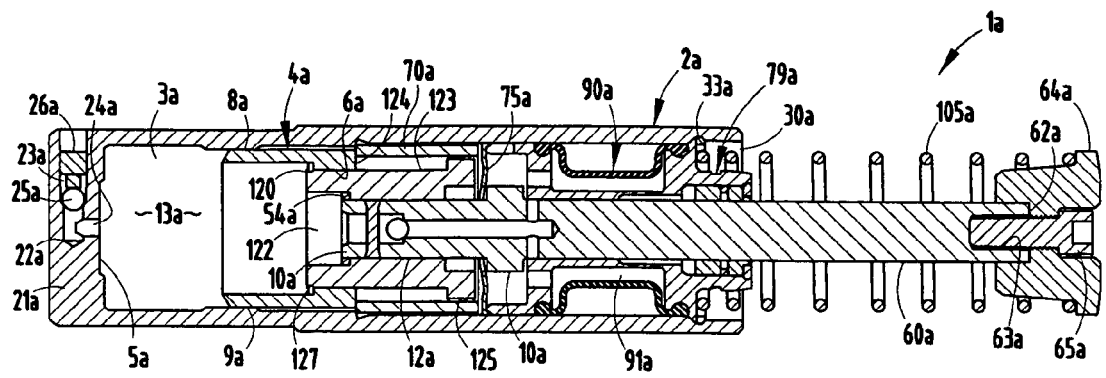
FIG. 8 is a cross-sectional view of another embodiment of the present invention having three telescoping pistons shown in a fully extended position.
Figure 9:
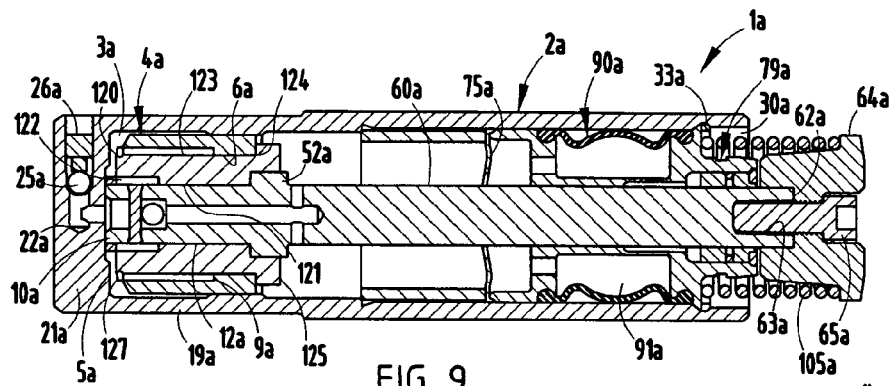
FIG. 9 is a cross-sectional view of the three step hydraulic shock absorber shown in FIG. 8, with all of the pistons shown in a fully collapsed position.

Outer body 2 (FIGS. 1-7) has a generally open end 30 disposed opposite closed end 5, and, as best illustrated in FIG. 7, includes an annular groove 31 disposed adjacent to the end edge 32 thereof. Outer body groove 31 is configured to closely receive a retaining ring 33 (FIGS. 1-4 and 7) therein for purposes to be described in greater detail hereinafter. The interior surface 20 of outer body sidewall 19, which defines at least in part central bore 3, includes a series of stepped surfaces 34-37 (FIG. 7) disposed axially sequentially from the closed end 5 of central bore 3 to the open end 30 thereof. Stepped central bore surface 35 has a diameter somewhat less than that of axially adjacent stepped bore surfaces 34 and 36, and defines the outer cylindrical surface portion of the first metering aperture 9. Stepped central bore surface 37 has a diameter slightly greater than that of axially adjacent stepped surface 36.

The illustrated first or larger piston 4 (FIGS. 6 and 7) has a generally annular configuration, wherein the cylindrical outer surface 8 has a substantially uniform diameter from the leading end 42 of piston 4 to the trailing end 44 of piston 4. Outer surface 8 is generally smooth, and has a predetermined diameter to mate with the stepped surface 35 of central bore 3 to form therebetween the first metering aperture 9, which has a generally annular shape, and a predetermined width "w1" (FIG. 6), as described in greater detail below. It is noteworthy that the outer surface 8 of piston 4 is not provided with a piston ring or other seal to abut with the stepped surface 35 of central bore 3. Rather, the outer surface 8 of piston 4 is specifically designed to be a predetermined amount smaller than the diameter of the stepped surface portion 35 of central bore 3 to define the first annularly-shaped metering aperture 9. Hence, as described in greater detail below, the displacement of hydraulic fluid 14 from pressure chamber 13 to achieve a selected reaction characteristic is controlled at least in part by the width "w1" of annular metering aperture 9, instead of a series of discrete circular metering apertures spaced axially along a hollow piston tube, as disclosed in prior U.S. Pat. No. 5,682,967, as discussed above.

The central piston bore 7 (FIG. 1-7) in piston 4 is also generally cylindrical in shape, and has a forward portion 41 with a substantially uniform diameter extending from the leading end 42 of piston 4 to a medial portion thereof, and a rearward portion 43 having a diameter somewhat less than that of forward portion 41 and extending from forward portion 41 to the trailing end 44 of piston 4. Piston 4 has a predetermined length which, as discussed in greater detail below, at least in part determines the stroke of piston 4 in central bore 3. Piston 4 is telescopingly positioned in the central bore 3 of outer body 2 to extend between the fully extended position shown in FIG. 1 to the fully collapsed position shown in FIG. 4.

The illustrated second or smaller piston 10 (FIGS. 1-7) has a generally cylindrical shape, wherein the outer surface 11 has a substantially uniform diameter from the cylinder end 50 thereof to a location adjacent the rod end 51 thereof, which has an enlarged, disk-shaped head 52. The outer surface 11 of piston 10 is generally smooth, and is telescopingly received within the rearward portion 43 of central piston bore 7. Smaller piston 10 has an outside diameter which is dimensioned slightly less than the diameter of the rearward portion 43 of central piston bore 7, so as to define the second annularly-shaped metering aperture 12 therebetween having a predetermined width "w2" (FIG. 6). As with the first annular metering aperture 9, the displacement of hydraulic fluid 14 from pressure chamber 13 to achieve a selected reaction characteristic is controlled at least in part by the width "w2" of the second annular metering aperture 12. Piston 10 includes a circumferential groove 54 disposed adjacent cylinder end 50, which receives therein a stop which, in the illustrated example, is in the form of a retaining ring 55. As described in greater detail below, retaining ring 55 is configured to abut the ledge between the forward and rearward portions 41, 43 of larger piston 4 when hydraulic shock absorber 1 shifts to the fully extended position shown in FIG. 1. The outside diameter of retaining ring 55 is sufficiently smaller than the inside diameter of the forward portion 41 of central piston bore 7, such that there is no significant metering of the flow of hydraulic fluid 14 therebetween during operation of hydraulic shock absorber 1. Piston 10 shifts telescopingly in the central piston bore 7 of piston 4 between the fully extended position shown in FIG. 1 and the fully collapsed position shown in FIG. 4.

In the illustrated examples (FIGS. 1-7), a piston rod 60 is formed integrally with smaller piston 10 and extends from the enlarged head 52 of piston 10 outwardly through the open end 30 of outer body 2. The illustrated piston rod 60 has a generally cylindrical shape and a circular free end 62 having an axially extending threaded fastener aperture 63 therein. An impact button 64 is mounted on the free end 62 of piston rod 60 by a threaded fastener 65 which is anchored in fastener aperture 63.

The illustrated hydraulic shock absorber 1 also includes an annularly-shaped spacer 70 mounted in a medial portion of the central bore 3 of outer body 2. The outer surface 71 of spacer 70 is generally cylindrical in shape, and is received closely against the stepped surface portion 37 of central bore 3. The forward end 72 of spacer 70 abuts the inner face between stepped surfaces 37 and 36 so as to positively retain spacer 70 in its predetermined axial position within central bore 3. Spacer 70 also includes a cylindrically-shaped inner surface 73. The rearward end 76 of spacer 70 includes a central bore defined by inner surface 73 in which the enlarged head portion 52 of smaller piston 10 is received. In the illustrated examples (FIGS. 1-7), a bearing 79 in the form of a sleeve extends from the rearward end 76 of spacer 70 to groove 31 in the central bore 3 of outer body 2. Bearing 79 has a smooth inner wall adjacent which the outer surface of piston rod 60 telescopingly shifts in an axial direction. The forward portion of bearing 79 includes a plurality of axially extending bores or passageways 78 through which hydraulic fluid flows. A wave spring 75 is positioned between spacer 70 and bearing 79, and serves to take up manufacturing tolerances. As noted above, retaining ring 33 is mounted in the groove 31 of outer body 2, and serves to retain spacer 70, wave spring 75 and bearing 79 in the predetermined axial positions shown in FIGS. 1-4. A U-cup 86 is mounted on piston rod 60 adjacent retaining ring 33 and supports a wiper 87 which is closely received against the outer side surface 61 of piston rod 60. Retaining ring 88 (FIG. 7) retains U-cup 86, spacer 89 and wiper 87 in place.

In the illustrated examples, a differential accumulator 90 is disposed within the central bore 3 of outer body 2 adjacent the open end thereof, and extends from the outer end 76 of spacer 70 to retaining ring 33. Differential accumulator 90 is in the nature of an annularly-shaped resilient sleeve which forms an accumulator chamber 91 adapted to receive hydraulic fluid which flows through the passageways 78 in bearing 79, as described below.

As noted above, the central bore 3 of outer body 2 defines pressure chamber 13 between closed end 5 and the leading or cylinder ends 42 and 50 of pistons 4 and 10. Pressure chamber 13 is filled with a hydraulic fluid 14 having predetermined flow characteristics including viscosity, density, thermal expansion, etc. The hydraulic fluid 14 completely fills pressure chamber 13, such that there is no entrapped air within the same. A passageway 98 extends axially through the central portion of piston 10, and includes an enlarged valve seat 99 at the cylinder end thereof in which a ball valve 100 is closely received and retained. A spring pin 102 extends radially through piston 10 and passageway 98, and serves to control the travel of ball valve 100. Passageway 98 extends through the rod end 62 of piston 10 into the forward end of piston rod 60, and communicates with axially extending passageways 101. Ball valve 100 prevents hydraulic fluid from flowing through the passageways 98 and 101 from pressure chamber 13 into accumulator chamber 91, yet permits hydraulic fluid 14 to flow through the passageways 98 and 101 from accumulator chamber 91 into pressure chamber 13, as described in greater detail thereinafter.

The illustrated hydraulic shock absorber 1 includes means, such as the illustrated spring 105, for biasing both pistons 4 and 10 to their fully extended positions, as shown in FIG. 1. In the illustrated example, spring 105 is in the form of a coil spring, having one end abutting retaining ring 33 and an interior rim on impact button 64. Hence, in operation, hydraulic shock absorber 1 normally assumes the fully extended position shown in FIG. 1. When inwardly directed impact forces act on the impact button 64 on piston rod 60, the pistons 4 and 10 are sequentially shifted toward the closed end 5 of outer body 2, thereby displacing the hydraulic fluid 14 in pressure chamber 13 through the first and second metering apertures 9 and 12 respectively to progressively dampen the impact forces. More specifically, in the fully extended position shown in FIG. 1, spring 105 biases piston rod 60 outwardly, which locates the second or smaller piston 10 in its fully extended position. The ring 55 at the cylinder end 50 of smaller piston 10 engages the ledge between the forward and rearward portions 41 and 43 of larger piston 4 to positively shift the larger piston 4 to its fully extended position, as shown in FIG. 1. The trailing end 44 of larger piston 4 engages the forward end 72 of spacer 70 to locate pistons 4 and 10 in their fully extended positions. When inwardly directed impact forces act on button 64, smaller piston 10 is shifted axially inwardly with respect to both outer body 2 and larger piston 4. Because larger piston 4 is not fixedly attached to smaller piston 10 or piston rod 60, it does not shift axially relative to outer body 2 until smaller piston 10 is shifted to a first collapsed position (FIG. 3), at which point the enlarged head 52 of smaller piston 10 engages the rod end 62 of larger piston 4. The pressurization of the hydraulic fluid 14 in pressure chamber 13 caused by the collapsing motion of smaller piston 10 will bias or force the larger piston 4 back against the forward end 72 of spacer 70, and retain the same stationary in central bore 3 until smaller piston 10 assumes the first collapsed position shown in FIG. 3. Consequently, initial impact forces acting on button 64 shift only smaller piston 10. However, the hydraulic fluid 14 in pressure chamber 13 is displaced through both the first annular metering aperture 9 between the outer surface 8 of larger piston 4 and the stepped surface 35 of central bore 3, and the second annularly-shaped metering aperture 12 between the outer surface 11 of smaller piston 10 and the inner surface 6 of the central piston bore 7 in larger piston 4. As hydraulic shock absorber 1 continues to absorb the inwardly directed impact forces, smaller piston 10 will shift to the first collapsed position shown in FIG. 3, wherein the enlarged head 52 of smaller piston 10 engages or abuts the rod side 44 of larger piston 4, which closes off metering aperture 12, and causes both pistons 4 and 10 to shift axially together as they move toward the closed end 5 of central bore 3 in the manner illustrated in FIG. 4. Hence, the damping of the impact forces is progressive, insofar as lesser resistance is created at the initial shifting of smaller piston 10, wherein hydraulic fluid flows through both metering apertures 9 and 12, and greater resistance is created as both the larger and smaller pistons 4 and 10 respectively shift axially together, with hydraulic fluid flowing only through FIG. 4. Hence, the damping of the impact forces is progressive, insofar as lesser resistance is created at the initial shifting of smaller piston 10, wherein hydraulic fluid flows through both metering apertures 9 and 12, and greater resistance is created as both the larger and smaller pistons 4 and 10 respectively shift axially together, with hydraulic fluid flowing only through metering aperture 9. As a consequence, the load is decelerated with the lowest possible force in the shortest possible time, thereby eliminating damaging force peaks and shock damage to machines and equipment. Once the impact forces have been completely dissipated or absorbed, the resilient biasing force of spring 105 urges piston rod 60, as well as pistons 4 and 10, back to their fully extended positions, as shown in FIG. 1. The hydraulic fluid 14, which was shifted from the pressure chamber 13, through annular metering apertures 9 and 12, and into the accumulator chamber 91, is then redirected back into the pressure chamber 13. More specifically, smaller piston 10 is first shifted axially outwardly toward its fully extended position, such that the oil in accumulator chamber 91 is displaced through passageways 98 and 101, past ball valve 100 into pressure chamber 13. When smaller piston 10 extends, retainer ring 55 engages the ledge between the forward and rearward portions 41 and 43 of larger piston 4, thereby positively shifting larger piston 4, together with smaller piston 10, toward their fully extended positions, as shown in FIG. 1, and forcing the hydraulic fluid 14 in accumulator chamber 91 through passageways 98 and 101 and ball valve 100 into pressure chamber 13. Some hydraulic fluid 14 will also flow back to pressure chamber 13 through metering apertures 9 and 12, although the amount is rather limited due to the size of the same.

In operation, hydraulic shock absorber 1a operates in substantially the same manner as hydraulic shock absorber 1, as discussed above. Initial impact forces shift smaller piston 10a absorber 1a is similar to the previous described hydraulic shock absorber 1, similar parts appearing in FIGS. 1-7 and FIGS. 8-9 respectively are represented by the same, corresponding reference numerals, except for the suffix "a" in the numerals of the latter.

In hydraulic shock absorber 1a, an intermediate piston 120 is telescopingly received between first piston 4a and second piston 10a. Intermediate piston 120 is generally similar to first piston 4a, except that it has a somewhat smaller diameter. More specifically, intermediate piston 120 has an annular shape with a cylindrically-shaped inner surface 121 defining a central piston bore 122, and a cylindrically-shaped outer surface 123 disposed adjacent the inner surface 6a of piston 4a to define a third annularly-shaped metering aperture 124 therebetween. Like smaller piston 10a, intermediate piston 120 includes an enlarged head 125, and a circumferential groove adjacent the cylinder end thereof to receive annularly-shaped retaining ring 127. In the illustrated example, the enlarged, disk-shaped head of intermediate piston 120 has an outwardly opening, cylindrically-shaped recess in which the enlarged head portion of second piston 10a is closely received. This recess increases the travel or stroke of second piston 10a, such that the depth of the recess can be varied to adjust the stroke of second piston 10a.

In operation, hydraulic shock absorber 1a operates in substantially the same manner as hydraulic shock absorber 1, as discussed above. Initial impact forces shift smaller piston 10a inwardly until the head portion 52a thereof engages or abuts the rod end of intermediate piston 120, which closes off metering aperture 12a, and forces both smaller piston 10a and intermediate piston 120 to shift together toward the closed end 5a of central bore 3a. Continued absorption of the impact forces causes the head portion 125 of intermediate piston 120 to engage or abut the rod end 62a of larger piston 4a, which closes off metering aperture 124, and forces all three pistons 4a, 10a and 120 to shift together toward the closed end 5a of central bore 3a. In a fashion similar to hydraulic shock absorber 1, hydraulic oil is selectively shifted through the three annularly-shaped metering apertures 9a, 12a and 124 to progressively dampen the impact forces.

The reference numeral 1b (FIGS. 10 and 11) generally designates yet another embodiment of the present invention having a four part telescoping piston assembly. Since hydraulic shock absorber 1b is similar to the previously described hydraulic shock absorbers 1 and 1a, similar parts appearing in FIGS. 1-9 and FIGS. 10-11 respectively are represented by the same, corresponding reference numerals, except for the suffix "b" in the numerals of the latter.

In hydraulic shock absorber 1b, a second intermediate piston 140 is positioned between the first intermediate piston 120b and the smaller piston 10b. The second intermediate piston 140 is substantially similar to the first intermediate piston 120b, except that its diameter is somewhat smaller, so that the same is telescopingly received within the central piston bore of first intermediate piston 120b. More specifically, second intermediate piston 140 has a generally annular shape with a cylindrically-shaped inner surface defining a central piston bore, and a cylindrically-shaped outer surface disposed adjacent the inner surface of intermediate piston 120b to define a fourth annularly-shaped metering aperture 144 therebetween. Like first intermediate piston 120b, the outer surface of second intermediate piston 140 is substantially cylindrical. Second intermediate piston 140 has an enlarged head portion 145, and a circumferential groove disposed adjacent the cylinder end thereof to receive a retaining ring 149 therein.

In operation, hydraulic shock absorber 1b operates in a manner similar to that described above with respect to hydraulic shock absorber 1 and hydraulic shock absorber 1a. Initial impact forces shift smaller piston 10b inwardly until the head portion 52b thereof engages or abuts the rod end of second intermediate piston 140, which closes off metering aperture 12b, and forces both the smaller piston 10b and the second intermediate piston 140 to shift together toward the closed end 5b of central bore 3b. Continued absorption of the impact forces causes the head portion 145 of second intermediate piston 140 to engage or abut the rod end of the first intermediate piston 120b, which closes off metering aperture 144, and forces the smaller piston 10b, the second intermediate piston 140 and the first intermediate piston 120b to shift together toward the closed end 5b of central bore 3b. Continued absorption of the impact forces causes the head portion 125b of the first intermediate piston 120b to engage or abut the rod end of larger piston 4b, which closes off metering aperture 124b, and forces all four pistons 4b, 10b, 120b and 140 to shift together toward the closed end 5b of central bore 3b. In a fashion similar to hydraulic shock absorbers 1 and 1a, hydraulic oil is selectively shifted through the four annularly-shaped metering apertures 9b, 12b, 124b and 144 to progressively dampen the impact forces.

Figure 12:
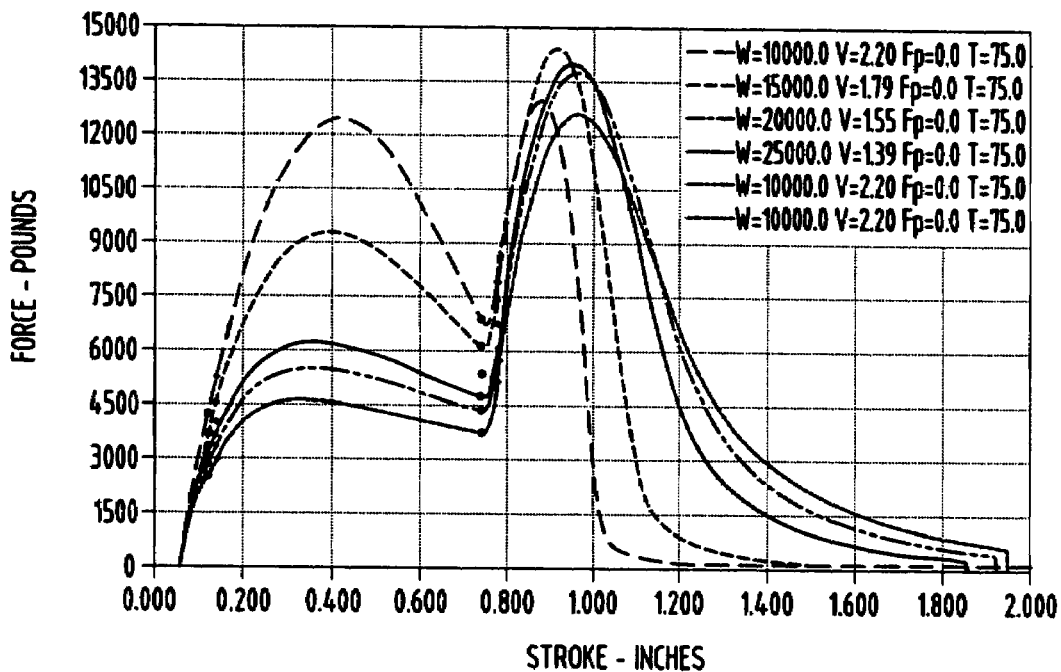
FIG. 12 is a graph illustrating various performance characteristics of a three step hydraulic shock absorber with a set of annular metering apertures of first predetermined dimensions around the pistons.
Figure 13:
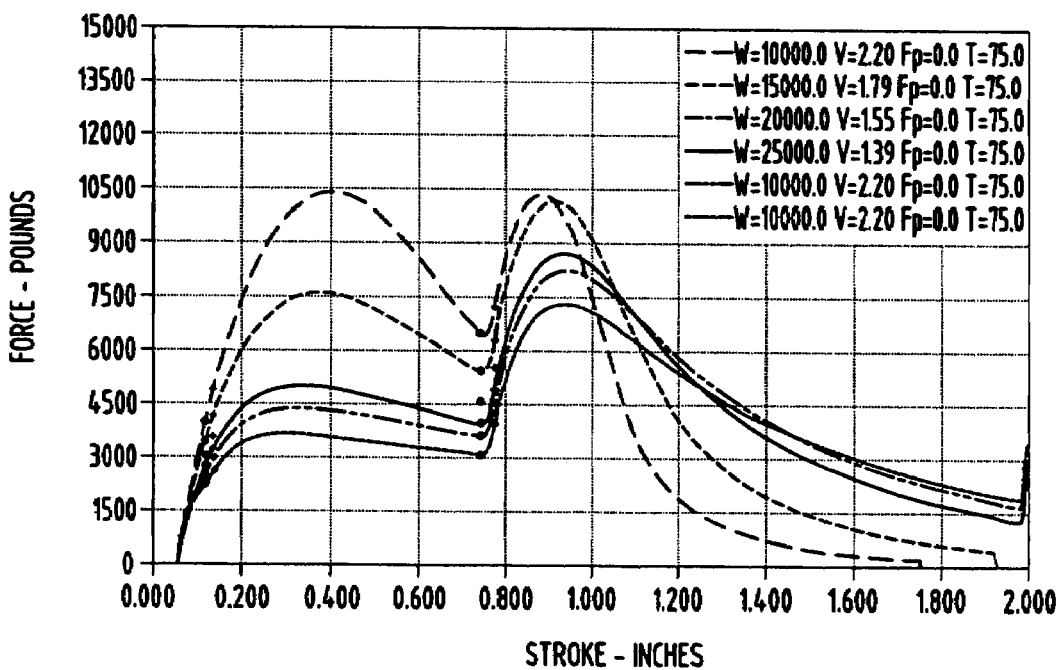
FIG. 13 is a graph illustrating various performance characteristics of a three step hydraulic shock absorber with a set of annular metering apertures of second predetermined dimensions around the pistons.
Figure 14:
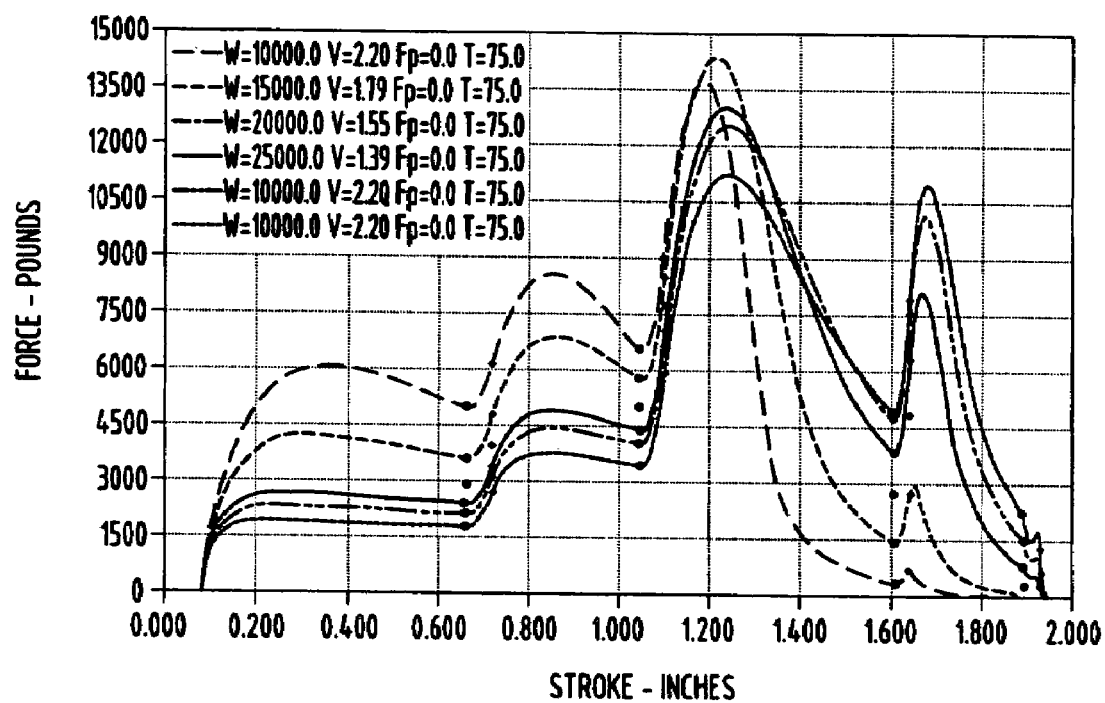
FIG. 14 is a graph illustrating various performance characteristics of a four step hydraulic shock absorber with a set of annular metering apertures of third predetermined dimensions around the pistons.

With reference to FIGS. 12-14, shock absorbers 1, 1a and 1b have somewhat different reaction characteristics based upon the number of pistons, the width of the metering apertures, the stroke of the pistons, and the type of hydraulic fluid used. For example, FIG. 12 illustrates a three step hydraulic shock absorber of the type shown in FIGS. 8 and 9, which has three individual pistons sized to provide a predetermined width to the three annular metering apertures, and predetermined piston strokes. As is apparent from FIG. 12, the reaction characterstics of the associated hydraulic shock absorber are quite similar for weights of 10,000; 15,000; 20,000; 25,000; 30,000 and 35,000 pounds.

FIG. 13 is graph of the reaction forces associated with a hydraulic shock absorber substantially similar to the hydraulic shock absorber of FIG. 12, except that the widths of the associated annular metering apertures have been increased. More specifically, in the hydraulic shock absorber whose characteristics are illustrated in FIG. 12, the associated pistons are dimensioned as follows.

| Piston Number | Piston Stroke | Piston Diameter | Width of Annular Metering Aperture |
| --- | --- | --- | --- |
| 1 | 0.1320 inches | 0.500 inches | w1 = .0013 inches |
| 2 | 0.6312 inches | 1.000 inches | w2 = .0014 inches |
| 3 | 1.2320 inches | 1.312 inches | w3 = .0013 inches |

In contrast, the hydraulic shock absorber having the characteristics illustrated in FIG. 13 has the pistons dimensioned as follows.

| Piston Number | Piston Stroke | Piston Diameter | Width of Annular Metering Aperture |
| --- | --- | --- | --- |
| 1 | 0.1320 inches | 0.500 inches | w1 = .0013 inches |
| 2 | 0.6310 inches | 1.000 inches | w2 = .0013 inches |
| 3 | 1.2320 inches | 1.312 inches | w3 = .0015 inches |

Hence, only the diameters of the second and third pistons have been varied between the hydraulic cylinders having the characteristics illustrated in FIGS. 12 and 13, such that the associated annular metering space "w2" is decreased by 0.0001 inches, and the "w3" metering space is increased by 0.0002 inches. As is apparent from a comparison of the graphs illustrated in FIGS. 12 and 13, the hydraulic shock absorber having the larger annular metering apertures together as a sum (FIG. 13) causes less reaction force.

Figure 10:
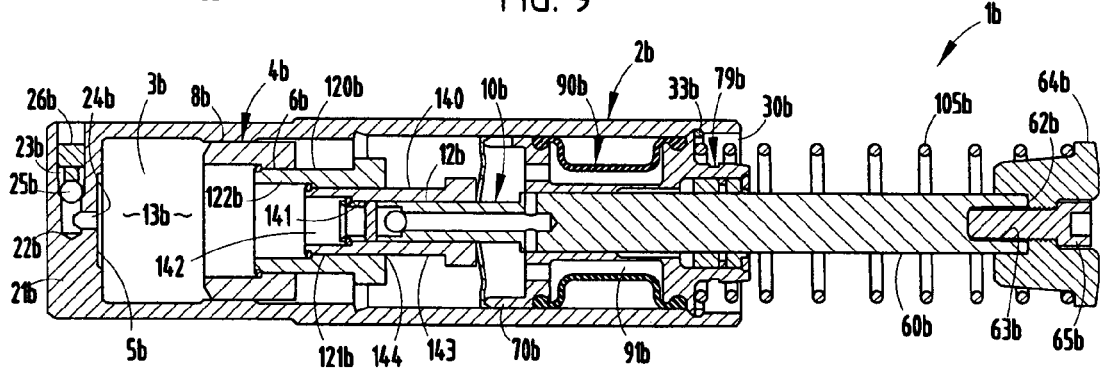
FIG. 10 is a cross-sectional view of yet another embodiment of the present invention having four telescoping pistons shown in a fully extended position.
Figure 11:
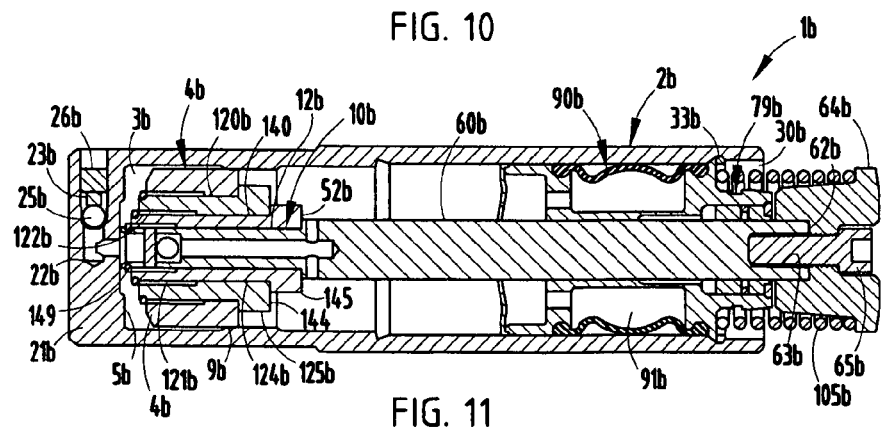
FIG. 11 is a cross-sectional view of the four step hydraulic shock absorber shown in FIG. 10, with all of the pistons shown in a fully collapsed position.

FIG. 14 is a graph of the reaction characteristics of a four step hydraulic shock absorber, such as that illustrated in FIGS. 10 and 11. Once again, the reaction characteristics of the hydraulic shock absorber associated with the FIG. 14 graph are relatively similar for weights of 10,000; 15,000; 20,000; 25,000; 30,000 and 35,000 pounds. However, as is readily apparent from a comparison of the graph in FIG. 14 with the graphs of FIGS. 12 and 13, the reaction characteristics have been changed rather dramatically because of the fourth piston and associated annular metering aperture.

Each of the hydraulic shock absorbers 1, 1a and 1b is preferably manufactured from a common outer body 2. As explained above, shock absorbers 1, 1a and 1b each have slightly different reaction characteristics based upon the number of pistons, as well as the relative dimensioning of the same, and the associated widths of the annular metering apertures. Consequently, while each individual hydraulic shock absorber 1, 1a and 1b is of the nonadjustable type, by using a common outer body 2 and different pistons 4, 10, 120 and 140, a wide variety of different hydraulic shock absorbers can be manufactured, which have a wide range of different reaction forces. Hence, the present invention provides the ability to inexpensively fabricate a progressive, self-compensating, nonadjustable shock absorber having a wide range of predetermined reaction characteristics using common parts, and without the need for precisely formed discrete metering orifices. As note above, outer body 2 is preferably used to manufacture a series of different hydraulic shock absorbers, each having slightly different characteristics to correspond to the anticipated impact forces to be absorbed. It is contemplated that pistons 4, 10, 120 and 140 will be manufactured with different diameters, so as to vary the widths of metering apertures 9, 12, 124 and 144. Furthermore, it is contemplated that the pistons 4, 10, 120 and 140 be provided in varying stroke lengths, either by providing different individual pistons, adjusting the depth of piston head recesses as noted above, or relocating stops along the length thereof. Consequently, a custom made hydraulic shock absorber, designed to have specific predetermined reaction characteristics, can be fabricated using a single outer body 2 by simply varying the number of telescoping pistons to adjust the progressive damping reaction forces, the diameters of the pistons to vary the metering of hydraulic fluid through the metering apertures, and the piston strokes to accommodate different types of impacts. Furthermore, the reaction characteristics of any given hydraulic shock absorber may be adjusted by providing a wide variety of different types of hydraulic fluids, each having different flow characteristics, such as density, viscosity, etc. By selecting a specific hydraulic fluid, in combination with the number of telescoping pistons and their relative dimensions, a wide variety of nonadjustable shock absorbers can be made in a very effective and efficient manner.

In the foregoing description, it will be readily appreciated by those skilled in the art that modifications may be made to the invention without departing from the concepts disclosed herein. Such modifications are to be considered as included in the following claims, unless these claims, by their language, expressly state otherwise.

The invention claimed is:

1. A hydraulic shock absorber, comprising:
an outer body having a central body bore defined by a cylindrical sidewall surface, a closed end and an open end disposed opposite said closed end;
a first piston telescopingly received in the central body bore of said outer body adjacent said closed end thereof, and having a generally annular shape with a cylindrically-shaped inner surface defining a central piston bore, and a cylindrically-shaped outer surface disposed adjacent said sidewall surface of said central body bore to define a first annularly-shaped metering aperture therebetween;
a second piston telescopingly received in the central piston bore of said first piston, and having a generally cylindrically-shaped outer surface disposed adjacent said inner surface of said first piston to define a second annularly-shaped metering aperture therebetween; said central body bore defining a pressure chamber between said first and second pistons and said closed end of said outer body;
a piston rod having a first end thereof operably connected with said second piston and a second end thereof disposed adjacent said open end of said outer body; and
hydraulic fluid disposed in said pressure chamber, whereby inwardly directed impact forces acting on said second end of said piston rod shift said first and second pistons toward said closed end of said outer body, thereby displacing said hydraulic fluid in said pressure chamber through said first and second metering apertures to progressively dampen the impact forces.

2. A hydraulic shock absorber as set forth in claim 1, wherein:
said second piston shifts axially within said first piston between an extended position and a first collapsed position, wherein said second piston engages said first piston and closes off said second metering aperture.

3. A hydraulic shock absorber as set forth in claim 2, wherein:
said first piston shifts axially within said central body bore between an extended position and a second collapsed position.

4. A hydraulic shock absorber as set forth in claim 3, including:
means for biasing said first piston to said extended position.

5. A hydraulic shock absorber as set forth in claim 3, including: means for biasing said first piston and said second piston to said extended position.

6. A hydraulic shock absorber as set forth in claim 5, including:
a stop positioned on said second piston to abut said first piston when said second piston is in said first collapsed position to positively shift said first and second pistons together to said second collapsed position.

7. A hydraulic shock absorber as set forth in claim 6, wherein:
said outer body has a generally tubular configuration.

8. A hydraulic shock absorber as set forth in claim 7, including:
an accumulator chamber disposed adjacent said open end of said outer body, and communicating with said first and second metering apertures to receive said hydraulic fluid therein.

9. A hydraulic shock absorber as set forth in claim 8, wherein:
said second piston includes a passageway extending between said pressure chamber and said accumulator chamber; and including
a check valve disposed in said passageway to prevent said hydraulic fluid from flowing through said passageway from said pressure chamber into said accumulator chamber, yet permit said hydraulic fluid to flow through said passageway from said accumulator chamber into said pressure chamber.

10. A hydraulic shock absorber as set forth in claim 9, wherein:
said means for biasing said first and second pistons comprises a coil spring disposed between and operably connected with said open end of said outer body and said second end of said piston.

11. A hydraulic shock absorber as set forth in claim 10, wherein:
said stop comprises a disk-shaped head on said second piston at a position thereon adjacent said first end of said piston rod.

12. A hydraulic shock absorber as set forth in claim 11, including:
a button mounted on said second end of said piston rod and configured to receive impact forces thereon.

13. A hydraulic shock absorber as set forth in claim 12, wherein:
said outer body comprises a one-piece housing.

14. A hydraulic shock absorber as set forth in claim 13, including:
a bearing mounted in said housing and closely receiving said second end of said piston rod therein.

15. A hydraulic shock absorber as set forth in claim 1, including:
means for biasing said first and second pistons to an extended position.

16. A hydraulic shock absorber as set forth in claim 1, including:
a stop positioned on said second piston to abut said first piston when said second piston shifts toward said closed end of said outer body, such that said first and second pistons shift together to a fully collapsed position.

17. A hydraulic shock absorber as set forth in claim 1, wherein:
said outer body has a generally tubular configuration.

18. A hydraulic shock absorber as set forth in claim 1, including:
an accumulating chamber disposed adjacent said open end of said outer body, and communicating with said first and second metering apertures to receive said hydraulic fluid therein.

19. A hydraulic shock absorber as set forth in claim 18, wherein:
said second piston includes a passageway extending between said pressure chamber and said accumulator chamber; and including
a check valve disposed in said passageway to prevent said hydraulic fluid from flowing through said passageway from said pressure chamber into said accumulator chamber, yet permit said hydraulic fluid to flow through said passageway from said accumulator chamber into said pressure chamber.

20. A hydraulic shock absorber, comprising:
an outer body having a central body bore defined by a cylindrical sidewall surface, a closed end and an open end disposed opposite said closed end;
a first piston telescopingly received in the central body bore of said outer body adjacent said closed end thereof, and having a generally annular shape with a cylindrically-shaped inner surface defining a first central piston bore, and a cylindrically-shaped outer surface disposed adjacent said sidewall surface of said central body bore to define a first annularly-shaped metering aperture therebetween;
a second piston telescopingly received in the first central piston bore of said first piston, and having a generally annular shape with a cylindrically-shaped inner surface defining a second central piston bore, and a cylindrically-shaped outer surface disposed adjacent said inner surface of said first piston to define a second annularly-shaped metering aperture therebetween;
a third piston telescopingly received in the second central piston bore of said second piston, and having a generally cylindrically-shaped outer surface disposed adjacent said inner surface of said second piston to define a third annularly-shaped metering aperture therebetween; said central body bore defining a pressure chamber between said first, second and third pistons and said closed end of said outer body;
a piston rod having a first end thereof operably connected with said third piston and a second end thereof disposed adjacent said open end of said outer body; and
hydraulic fluid disposed in said pressure chamber, whereby inwardly directed impact forces acting on said second end of said piston rod shift said first, second and third pistons toward said closed end of said outer body, thereby displacing said hydraulic fluid in said pressure chamber through said first, second and third metering apertures to progressively dampen the impact forces.

21. A hydraulic shock absorber as set forth in claim 20, wherein:
said first, second and third pistons shift between a fully extended position and a fully collapsed position; and including
means for biasing said first, second and third pistons to said fully extended position.

22. A hydraulic shock absorber as set forth in claim 21, including:
a stop positioned on said second piston which engages said first piston to close off said second metering aperture, and positively shift said first and second pistons together to said fully collapsed position.

23. A hydraulic shock absorber as set forth in claim 22, including:
a stop positioned on said third piston which engages said second piston to close off said third metering aperture, and positively shift said second and third pistons together to said fully collapsed position.

24. A hydraulic shock absorber as set forth in claim 23, wherein:
said outer body has a generally tubular configuration.

25. A hydraulic shock absorber as set forth in claim 24, including:
an accumulator chamber disposed adjacent said open end of said outer body, and communicating with said first and second metering apertures to receive said hydraulic fluid therein.

26. A hydraulic shock absorber as set forth in claim 25, wherein:
said third piston includes a passageway extending between said pressure chamber and said accumulator chamber; and including
a check valve disposed in said passageway to prevent said hydraulic fluid from flowing through said passageway from said pressure chamber into said accumulator chamber, yet permit said hydraulic fluid to flow through said passageway from said accumulator chamber into said pressure chamber.

27. A hydraulic shock absorber as set forth in claim 26, wherein:
said means for biasing said first, second and third pistons comprises a coil spring disposed between and operably connected with said open end of said outer body and said second end of said piston.

28. A hydraulic shock absorber as set forth in claim 27, including:
a button mounted on said second end of said piston rod and configured to receive impact forces thereon.

29. A hydraulic shock absorber as set forth in claim 28, wherein:
said outer body comprises a one-piece housing; and
a bearing mounted in said housing and closely receiving said second end of said piston rod therein.

30. A method for making a hydraulic shock absorber, comprising:
providing an outer body having a central body bore defined by a cylindrical sidewall surface, a closed end and an open end disposed opposite the closed end;
providing a first piston having a generally annular shape with a cylindrically-shaped inner surface defining a central piston bore and a cylindrically-shaped outer surface;
positioning the first piston telescopingly within the central body bore of the outer body with the outer surface of the first piston disposed adjacent to the sidewall surface of the central body bore to define a first annularly-shaped metering aperture therebetween;
providing a second piston having a generally cylindrically-shaped outer surface;
positioning the second piston telescopingly within the central piston bore of the first piston with the outer surface of the second piston disposed adjacent to the inner surface of the first piston to define a second annularly-shaped metering aperture therebetween; and
installing hydraulic fluid in the central body bore of the outer body between the first and second pistons and the closed end of the outer body, such that inwardly directed impact forces acting on the first and second pistons displace the hydraulic fluid through the first and second metering apertures to progressively dampen the impact forces.

31. A method as set forth in claim 30, including:
providing means for biasing the first and second pistons to a fully extended position; and
positioning the biasing means between and operably connecting the same with the open end of the outer body and the second piston.

32. A method as set forth in claim 31, wherein:
said outer body providing step comprises forming the outer body into a generally tubular configuration.

33. A method as set forth in claim 32, including:
forming an accumulator chamber adjacent the open end of the outer body which communicates with the first and second metering apertures to receive said hydraulic fluid therein.

34. A method as set forth in claim 33, including:
forming a passageway in the second piston to extend between the pressure chamber and the accumulator chamber; and
positioning a check valve in the passageway to prevent the hydraulic fluid from flowing through the passageway from the pressure chamber into the accumulator chamber, yet permit the hydraulic fluid to flow through the passageway from the accumulator chamber into the pressure chamber.

35. A method as set forth in claim 34, including:
positioning a stop on the second piston which engages the first piston when the second piston is in a first collapsed position to close off the second metering aperture and positively shift the first and second pistons together to a fully collapsed position.

36. A method as set forth in claim 35, including:
providing a piston rod having first and second ends;
operably connecting the first end of the piston rod with the one second piston; and positioning the second end of the piston rod adjacent the open end of the outer body.

37. A method as set forth in claim 36, including:
providing a button adapted to receive impact forces thereon; and
operably connecting the button with the second end of the piston rod.

38. A method as set forth in claim 37, including:
mounting a bearing in the central bore of the outer body to slidingly support the piston rod for axial shifting.

39. A method as set forth in claim 38, including:
forming the outer body as a one-piece housing.

40. A method for making a hydraulic shock absorber having predetermined reaction characteristics, comprising:
providing an outer body having a central body bore defined by a cylindrical sidewall surface, a closed end and an open end disposed opposite the closed end;
providing a plurality of first pistons having a generally annular shape with cylindrically-shaped inner surfaces defining central piston bores with a variety of different diameters and cylindrically-shaped outer surfaces with a variety of different diameters;
selecting one of the first pistons and positioning the same telescopingly within the central body bore of the outer body with the outer surface of the one piston disposed adjacent to the sidewall surface of the central body bore to define a first annularly-shaped metering aperture therebetween with a predetermined width selected to correspond with at least a portion of the predetermined reaction characteristics of the hydraulic shock absorber;
providing a plurality of second pistons having generally cylindrically-shaped outer surfaces with a variety of different diameters;
selecting one of the second pistons and positioning the same telescopingly within the central piston bore of the one first piston with the outer surface of the one second piston disposed adjacent to the inner surface of the one first piston to define a second annularly-shaped metering aperture therebetween with a predetermined width selected to correspond with at least a portion of the predetermined reaction characteristics of the hydraulic shock absorber; and
installing hydraulic fluid in the central body bore of the outer body between the one first and second pistons and the closed end of the outer body, such that inwardly directed impact forces acting on the one first and second pistons displace the hydraulic fluid through the first and second metering apertures to progressively dampen the impact forces in a manner consistent with the predetermined reaction characteristics of the hydraulic shock absorber.

41. A method as set forth in claim 40, including:
providing the first piston with axial stops defining a variety of different strokes; and
selecting the one first piston with a first predetermined stroke selected to correspond with at least a portion of the predetermined reaction characteristics of the hydraulic shock absorber.

42. A method as set forth in claim 41, including:
providing the second piston with axial stops defining a variety of different strokes; and
selecting the one second piston with a second predetermined stroke selected to correspond with at least a portion of the predetermined reaction characteristics of the hydraulic shock absorber.

43. A method as set forth in claim 42, including:
providing a plurality of hydraulic fluids with a variety of different flow characteristics; and
selecting one of the hydraulic fluids to correspond with at least a portion of the predetermined reaction characteristics of the hydraulic shock absorber.

44. A method as set forth in claim 43, including:
providing means for biasing the one first and second pistons to a fully extended position; and
positioning the biasing means between and operably connecting the same with the open end of the outer body and the second piston.

45. A method as set forth in claim 44, wherein:
said outer body providing step comprises forming the outer body into the form of a generally tubular, one-piece housing.

46. A method as set forth in claim 45, including:
forming an accumulator chamber adjacent the open end of the outer body which communicates with the first and second metering apertures to receive said hydraulic fluid therein.

47. A method as set forth in claim 46, including:
forming a passageway in the one second piston to extend between the pressure chamber and the accumulator chamber; and
positioning a check valve in the passageway to prevent the hydraulic fluid from flowing through the passageway from the pressure chamber into the accumulator chamber, yet permit the hydraulic fluid to flow through the passageway from the accumulator chamber into the pressure chamber.

48. A method as set forth in claim 47, including:
positioning a stop on the one second piston which engages the one first piston when the one second piston is in a first collapsed position to close off the second metering aperture and positively shift the one first and second pistons together to the fully collapsed position.

49. A method as set forth in claim 48, including:
providing a piston rod having first and second ends;
operably connecting the first end of the piston rod with the one second piston; and
positioning the second end of the piston rod adjacent the open end of the outer body.

50. A method for making a hydraulic shock absorber having predetermined reaction characteristics, comprising:
providing an outer body having a central body bore defined by a cylindrical sidewall surface, a closed end and an open end disposed opposite the closed end;
providing a plurality of first pistons having a generally annular shape with cylindrically-shaped inner surfaces defining central piston bores, cylindrically-shaped outer surfaces, and axial stops defining a variety of different strokes;
selecting one of the first pistons with a first predetermined stroke selected to correspond with at least a portion of the predetermined reaction characteristics of the hydraulic shock absorber, and positioning the same telescopingly within the central body bore of the outer body for axial translation between the predetermined stroke, with the outer surface of the one piston disposed adjacent to the sidewall surface of the central body bore to define a first annularly-shaped metering aperture therebetween;

providing a plurality of second pistons having generally cylindrically-shaped outer surfaces and axial stops defining a variety of different strokes;
selecting one of the second pistons with a second predetermined stroke selected to correspond with at least a portion of the predetermined reaction characteristics of the hydraulic shock absorber, and positioning the same telescopingly within the central piston bore of the one first piston for axial translation between the second predetermined stroke, with the outer surface of the one second piston disposed adjacent to the inner surface of the one first piston to define a second annularly-shaped metering aperture therebetween; and
installing hydraulic fluid in the central body bore of the outer body between the one first and second pistons and the closed end of the outer body, such that inwardly directed impact forces acting on the one first and second pistons displace the hydraulic fluid through the first and second metering apertures to progressively dampen the impact forces in a manner consistent with the predetermined reaction characteristics of the hydraulic shock absorber.

51. A method as set forth in claim 50, including:
providing a plurality of hydraulic fluids with a variety of different flow characteristics; and
selecting one of the hydraulic fluids to correspond with at least a portion of the predetermined reaction characteristics of the hydraulic shock absorber.

52. A method as set forth in claim 51, including:
providing means for biasing the one first and second pistons to a fully extended position; and
positioning the biasing means between and operably connecting the same with the open end of the outer body and the second piston.

53. A method as set forth in claim 52, wherein:
said outer body providing step comprises forming the outer body into a generally tubular configuration.

54. A method as set forth in claim 53, including:
forming an accumulator chamber adjacent the open end of the outer body which communicates with the first and second metering apertures to receive said hydraulic fluid therein.

55. A method as set forth in claim 54, including:
forming a passageway in the one second piston to extend between the pressure chamber and the accumulator chamber; and
positioning a check valve in the passageway to prevent the hydraulic fluid from flowing through the passageway from the pressure chamber into the accumulator chamber, yet permit the hydraulic fluid to flow through the passageway from the accumulator chamber into the pressure chamber.

56. A method as set forth in claim 55, including:
positioning a stop on the one second piston which engages the one first piston when the one second piston is in a first collapsed position to close off the second metering aperture and positively shift the one first and second pistons together to the fully collapsed position.

57. A method as set forth in claim 55, including:
providing a piston rod having first and second ends;
operably connecting the first end of the piston rod with the one second piston; and
positioning the second end of the piston rod adjacent the open end of the outer body.

58. A method as set forth in claim 57, including:
mounting a bearing in the central bore of the outer body to slidingly support the piston rod for axial shifting.

59. A method as set forth in claim 58, including:
forming the outer body as a one-piece housing.

60. A method for making a hydraulic shock absorber having predetermined reaction characteristics, comprising:
providing an outer body having a central body bore defined by a cylindrical sidewall surface, a closed end and an open end disposed opposite the closed end;
providing a first piston having a generally annular shape with a cylindrically-shaped inner surface defining a central piston bore and a cylindrically-shaped outer surface;
positioning the first piston telescopingly within the central body bore of the outer body with the outer surface of the first piston disposed adjacent to the sidewall surface of the central body bore to define a first annularly-shaped metering aperture therebetween;
providing a second piston having a generally cylindrically-shaped outer surface;
positioning the second piston telescopingly within the central piston bore of the first piston with the outer surface of the second piston disposed adjacent to the inner surface of the first piston to define a second annularly-shaped metering aperture therebetween;
providing a plurality of hydraulic fluids with a variety of different flow characteristics;
selecting one of the hydraulic fluids to correspond with at least a portion of the predetermined reaction characteristics of the hydraulic shock absorber; and
installing the selected hydraulic fluid in the central body bore of the outer body between the first and second pistons and the closed end of the outer body, such that inwardly directed impact forces acting on the first and second pistons displace the hydraulic fluid through the first and second metering apertures to progressively dampen the impact forces in a manner consistent with the predetermined reaction characteristics of the hydraulic shock absorber.

61. A method as set forth in claim 60, including:
providing means for biasing the one first and second pistons to a fully extended position; and
positioning the biasing means between and operably connecting the same with the open end of the outer body and the second piston.

62. A method as set forth in claim 61, wherein:
said outer body providing step comprises forming the outer body into a generally tubular configuration.

63. A method as set forth in claim 62, including:
forming an accumulator chamber adjacent the open end of the outer body which communicates with the first and second metering apertures to receive said hydraulic fluid therein.

64. A method as set forth in claim 63, including:
forming a passageway in the one second piston to extend between the pressure chamber and the accumulator chamber; and
positioning a check valve in the passageway to prevent the hydraulic fluid from flowing through the passageway from the pressure chamber into the accumulator chamber, yet permit the hydraulic fluid to flow through the passageway from the accumulator chamber into the pressure chamber.

65. A method as set forth in claim 64, including:
positioning a stop on the one second piston which engages the one first piston when the one second piston is in a first collapsed position to close off the second metering aperture and positively shift the one first and second pistons together to a fully collapsed position.

66. A method as set forth in claim 65, including:
providing a piston rod having first and second ends;
operably connecting the first end of the piston rod with the one second piston; and
positioning the second end of the piston rod adjacent the open end of the outer body.

67. A method as set forth in claim 66, including:
mounting a bearing in the central bore of the outer body to slidingly support the piston rod for axial shifting.

68. A method as set forth in claim 67, including:
forming the outer body as a one-piece housing.

\* \* \* \* \*

UNITED STATES PATENT AND TRADEMARK OFFICE
CERTIFICATE OF CORRECTION

PATENT NO. : 7,299,907 B2
APPLICATION NO. : 11/041761
DATED : November 27, 2007
INVENTOR(S) : Michael A. Ferkany It is certified that error appears in the above-identified patent and that said Letters Patent is hereby corrected as shown below:

Column 7, line 46; "Fig." should be --Figs.--.

Figure 4:
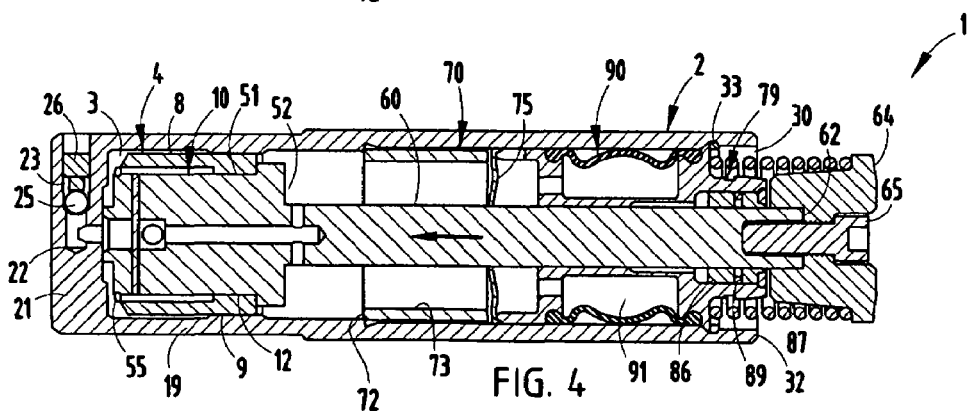
FIG. 4 is a cross-sectional view of the hydraulic shock absorber shown in FIGS. 1-3, wherein both the larger and smaller pistons are shown in a fully collapsed position.
Figure 5:
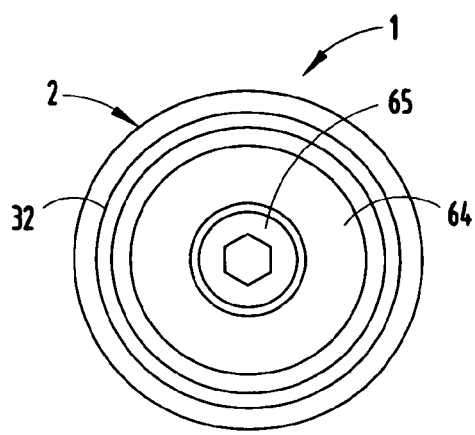
FIG. 5 is an end elevational view of the hydraulic shock absorber shown in FIGS. 1-6.

Column 10, lines 16-22; after "through" delete "Fig. 4. Hence, the damping of the impact forces is progressive, insofar as lesser resistance is created at the initial shifting of smaller piston 10, wherein hydraulic fluid flows through both metering apertures 9 and 12, and greater resistance is created as both the larger and smaller pistons 4 and 10 respectively shift axially together, with hydraulic fluid flowing only through".

Column 10, lines 49-52; "In operation, hydraulic shock absorber 1a operates in substantially the same manner as hydraulic shock absorber 1, as discussed above. Initial impact forces shift smaller piston 10a" should be --The reference numeral 1a (Figs. 8 and 9) generally designates another embodiment of the present invention, having a three part telescoping piston assembly. Since hydraulic shock--.

Column 12, line 23; after "is", insert --a--.

Column 13, line 20; "note" should be --noted--.

Signed and Sealed this

Twelfth Day of August, 2008

JON W. DUDAS
*Director of the United States Patent and Trademark Office*